Patented June 23, 1942

2,287,599

UNITED STATES PATENT OFFICE 2,287,599

PRODUCTION OF DEXTRINE FROM STARCH

August J. Bulfer, Berwyn, and Clark C. Gapen, Oak Park, Ill., assignors to Corn Products Refining Company, New York, N. Y., a corporation of New Jersey No Drawing. Application July 5, 1940, Serial No. 344,070

10 Claims. (Cl. 127—38)

This invention relates to the treatment of starch for the production of dextrines; and the object of the invention is to provide a process of making dextrine from starch which is more convenient and economical than processes heretofore used and one which gives products superior in their characteristics to dextrines as heretofore produced.

The starch used in accordance with this invention may be corn starch, tapioca starch, potato starch or other starch; and the starch may be either in a raw state, or gelatinized or partially hydrolyzed such, for example, as thin boiling starches.

The invention is of particular value in the production of a high soluble white dextrine of good adhesive properties suitable for use as a library paste or like adhesive.

The ordinary converting agents used for the production of dextrine from starch are hydrochloric acid, nitric acid, acetic acid, chlorine gas and caustic soda.

The present invention is based upon the discovery that the dextrinization process may be shortened and/or dextrinization effected at a lower temperature if, in place of any of these agents, one uses a mixture of monochlor acetic acid and chlorine gas. Furthermore, the characteristics of the product, when made in accordance with the present invention, are improved in respect particularly to smoothness, tack or adhesiveness, stability, that is, maintenance of fluidity without thickening of the paste, and luster and whiteness of the film deposited from the paste. It is possible, by use of this process to obtain a high degree of fluidity and a high percentage of solubility.

*Example*—The following is a specific example of the reduction to practice of the invention. It will be understood that this example is purely informative and typical and is not to be regarded as limiting the invention to the particular operating data given. The intention is to cover all equivalents and also all modifications within the scope of the appended claims. The figures in parentheses indicate ranges which, however, are not to be regarded as critical but merely as indicating practical working limits.

To 2000 pounds of corn starch containing 5% moisture (5%–10%) is added, by atomizing and mixing, 4 pounds (0.05%–0.4% by weight of the starch) of monochlor acetic acid which has been dissolved in 33 pounds (30 to 35) of water. This gives the acidified starch a pH of 2.7 (2.5–3.0). The pH of the starch is determined by suspending a sample in water, filtering and determining the pH of the filtrate.

The acidified starch is introduced into a dextrine cooker, of the jacketed or steam coil or other type and provided with an agitator, where the batch is heated to 225° F. (200°–250° F.) which will ordinarily require about two hours. The heating is continued for about one hour longer, or until the moisture content of the starch is reduced to 0.5% (0.1%–2%) whereupon 12 ounces of chlorine gas are added (2 to 20 ounces depending upon the solubility desired) giving the material a pH of about 2.5 (2.2–2.75), and the heating continued at 250° F. (250° to 300° F.) for about one and one-half hours (1–3 hours). During the heating and converting operation the agitator is kept in movement.

The product will be a white dextrine of 85% solubles (80% to 90%) having a fluidity of 11 (10–11.5) in a mixture consisting of 3 parts of dextrine to 4 parts of water by weight.

The dextrine which most closely approaches the dextrine, the process of which has just been described, is known as Corn Products Refining Company No. 182 Dextrine and is made with hydrochloric acid as a dextrinizing agent but using dextrinizing temperatures as high as 295° F. The product has a solubles content of 85% and a 3–4 fluidity of 11.

However, in spite of the fact that these two dextrines have the same analyses the monochlor acetic acid-chlorine converted product has superior qualities in comparison with that made with hydrochloric acid as a converting agent. The monochlor acetic acid product gives a smoother paste, a paste which has better tack or adhesiveness, and one that is more stable, that is, will maintain its original fluidity without thickening for a longer period of time. The paste and the film deposited therefrom are whiter and the film has a higher gloss or luster.

As regards process it will be noted that the monochlor acetic acid product is converted at a lower temperature which is an advantage from the point of view of economy, and also involves less danger of charring and the formation of black specks.

Within limits the variables, pH, time and temperature may be adjusted one with respect to the other, and all may be varied in accordance with the type of dextrine desired in respect, for example, to percentage of solubles. Generally speaking, if one of these variables is increased, the other one or both of them must be decreased in order to get the same results.

The reason why a mixture of monochlor acetic acid and chlorine acts more efficiently than hydrochloric acid, or than the other common dextrinization agents has not been fully demonstrated. The theory is that the chlorine gas reacts with the monochlor acetic acid to form higher chlor actic acids, such as dichlor or trichlor acetic acid and that these higher chlorinated acetic acids bring about the conversion at the lower temperatures and the production of dextrines having the above mentioned superior properties. Whether this theory be so or not, the facts stated above seem to be well established by experience.

Monochlor acetic acid is a chlorinated fatty acid having a melting point of 62° C. (144° F.) and a boiling point of 189° C. (372° F.) which latter enables it to remain in the dextrine cooker during the heat conversion which may take place at a temperature of about 250° F. or somewhat higher. There are many other organic acids having boiling points as high as monochlor acetic acid. The monochlor acetic acid, however, has another property which differentiates it from most of the other high boiling point organic acids: it ionizes to a high degree whereas most organic acids do not fully ionize so that they do not give, when in contact with the moisture in the starch, as low a pH as monochlor acetic acid, the ionization constant of which is not much different from that of the mineral acids.

The following is a table showing the ionization constants of certain halogenated fatty acids, including monochlor acetic acid in comparison with hydrochloric and sulfuric acids:

| Kind of acid | Ionization constant |
| --- | --- |
| Hydrochloric acid | Greater than 1. |
| Sulfuric acid | $2 \times 10^{-2}$. |
| Acetic acid | $1.9 \times 10^{-5}$. |
| Monochlor acetic acid | $1.55 \times 10^{-3}$. |
| Dichlor acetic acid | $5 \times 10^{-2}$. |
| Alphachlor propionic acid | $1.47 \times 10^{-3}$. |
| Betachlor propionic acid | $8.6 \times 10^{-5}$. |
| Alpha brompropionic acid | $1.1 \times 10^{-3}$. |
| Beta brompropionic acid | $9.8 \times 10^{-5}$. |

From this table it will be seen that not all halogenated fatty acids will serve the purpose of the present invention. The iodine compounds may be ruled out at once because of the reaction giving colored products which takes place between iodine and starch. In addition to having a boiling point above the dextrinization temperature, the acid must have a fairly high ionization constant, for practical purposes at least $1 \times 10^{-3}$. It may be said, therefore, that, in place of monochlor acetic acid, one may use any halogenated fatty acid non-reactive with the starch, having a boiling point substantially above the dextrinization temperature to be used and an ionization constant of $1 \times 10^{-3}$ or higher.

The use of chlorine (or as an equivalent bromine-iodine being unavailable because of its reaction with the starch) appears to be essential in order to obtain the desired results. The theory expressed above, that the chlorine reacts with the monochlor acetic acid to form higher chlorinated acids is supported by the table of ionization constants given above, from which it appears that dichlor acetic acid has a higher ionization constant (lower pH) than monochlor acetic acid.

*Solubles test.*—Two grams of the dextrine to be tested for solubles is put into a 50 cc. beaker, to which is added, in small portions, 20 cc. of 77° F. temperature distilled water and the mixture stirred to form a lump-free, smooth paste. The contents of the beaker are washed into a 200 cc. volumetric flask with distilled water at 77° F. to make up to the 200 cc. mark. The material is continuously agitated for one hour in a water bath kept at 77° F. It is then filtered and 50 cc. of the clear filtrate transferred to a 100 cc. porcelain dish and evaporated to dryness on a steam bath and then heated for one hour at 125° C. (257° F.). The percentage of solubles (dry basis) equals the weight of this material multiplied by 200 and divided by the percentage of dry substance in the dextrine.

*Fluidity test.*—The test for fluidity is as follows: 100 grams of dextrine are mixed in a porcelain beaker with 135 cc. of cold water and allowed to stand, with occasional shaking, for three hours in a water bath kept at 77° F. The material is strained through a coarse cloth and poured into a fluidity funnel which consists of a 5 inch funnel and a glass tube drawn to a capillary point. The stem of the funnel is cut and the capillary tip joined on by means of a short piece of rubber tubing so that it is about 6 inches from the apex of the funnel to the point at which the stem has been cut. The fluidity equals the number of cubic centimeters which flow through the funnel in 70 seconds at 77° F.

We claim:

1. In the process of making dextrine which comprises heating starch in a dry state having distributed therein a converting agent: the improvement which consists in using as said converting agent monochlor acetic acid and chlorine gas with the material maintained at dextrinizing temperatures.

2. In the process of making dextrine which comprises heating starch having distributed therein a converting agent: the improvement which consists in using, in a starch having a moisture content not substantially in excess of 10%, as said converting agent monochlor acetic acid and chlorine gas with the material maintained at dextrinizing temperatures.

3. In the process of making dextrine which comprises heating starch in a dry state and having distributed therein a converting agent: the improvement which consists in treating the starch at dextrinizing temperatures using as said converting agent monochlor acetic acid to give the starch a pH of 2.5–3.0 and, after the moisture content has been reduced to about 0.1%–2%, completing the conversion by means of chlorine gas.

4. Process of making dextrine which comprises: heating starch having an initial moisture content not in excess of 10% in the presence of monochlor acetic acid and chlorine gas, distributed in the starch, at temperatures between 200° and 300° F.

5. Process of making dextrine which comprises: heating, at a dextrinizing temperature, starch in a dry state, having distributed therein monochlor acetic acid; and after the moisture content of the starch material has been substantially reduced introducing into the starch and distributing therein chlorine gas and continuing the heating at a dextrinizing temperature.

6. Process of making dextrine which comprises: heating the starch in a dry state and having distributed therein monochlor acetic acid at a temperature of about 225° F.; and when the moisture content of the starch material has been reduced to about 0.1%–2.0% introducing into the starch and distributing therein chlorine gas and continuing the heating at a temperature of about 250° F.

7. Process of making dextrine which comprises: heating, at a dextrinizing temperature, starch in a dry state and containing, distributed therein, monochlor acetic acid to give the starch a pH of about 2.5–3.0; and when the moisture content of the starch material has been reduced to about 0.1%–2.0% introducing into the starch, and distributing therein, chlorine gas and continuing the heating at a dextrinizing temperature.

8. Process of making dextrine which comprises: employing the following substances, in the proportions and with the procedures as follows: atomizing and distributing into 2000 pounds of corn starch having a moisture content of 5–10%, monochlor acetic acid dissolved in about 30–35 pounds of water to give the acidified starch a pH of 2.5–3.0; heating the acidified starch to and at a temperature of 200°–250° F. for about three hours or until the moisture content is reduced to 1%–2%; adding 2–20 ounces of chlorine gas and distributing the same in the starch; and continuing the heating at a temperature of 250°–300° F. for one to three hours.

9. Process of making dextrine which comprises using the following substances in the proportions and with the procedures as follows: atomizing 4 pounds of monochlor acetic acid dissolved in 33 pounds of water into and distributing the same through 2000 pounds of corn starch containing 5% moisture to give the acidified starch a pH of about 2.7; heating the acidified starch at a temperature of 225° F. for about two hours until the moisture is reduced to about 0.5%; then adding 12 ounces of chlorine gas and continuing the heating at about 250° F. for about one hour and a half.

10. In the process of making dextrine which comprises heating, at a dextrinizing temperature, starch in a dry state having distributed therein a dextrinizing agent: the improvement which consists in using as said dextrinizing agent a halogenated fatty acid of the group consisting of chlorinated and brominated fatty acids having a boiling point substantially above the dextrinizing temperature and which is non-reactive with the starch and has an ionization constant of $1 \times 10^{-3}$ or higher, together with a halogen corresponding to the halogen of the halogenated fatty acid.

AUGUST J. BULFER.
CLARK C. GAPEN.